United States Patent [19]

Nutter, Jr. et al.

[11] 4,059,851
[45] Nov. 22, 1977

[54] PRIORITY NETWORK FOR DEVICES COUPLED BY A COMMON BUS

[75] Inventors: Roy S. Nutter, Jr., Morgantown, W. Va.; Jerry R. Washburn, Alhambra, Calif.; John H. Verwys, Wichita, Kans.

[73] Assignee: NCR Corporation, Dayton, Ohio

[21] Appl. No.: 704,256

[22] Filed: July 12, 1976

[51] Int. Cl.² .............................................. G06F 9/18
[52] U.S. Cl. .................................................. 364/200
[58] Field of Search ......................... 340/172.5; 445/1; 364/200

[56] References Cited

U.S. PATENT DOCUMENTS

| 3,508,206 | 4/1970 | Norberg | 340/172.5 |
| 3,629,854 | 12/1971 | Hauck et al. | 340/172.5 |
| 3,680,054 | 7/1972 | Bunker et al. | 364/200 |
| 3,766,530 | 10/1973 | Ito | 340/172.5 |
| 3,831,151 | 8/1974 | Jones, Jr. et al. | 340/172.5 |
| 3,832,692 | 8/1974 | Henzel et al. | 340/172.5 |

*Primary Examiner*—Harvey E. Springborn
*Attorney, Agent, or Firm*—J. T. Cavender; Albert L. Sessler, Jr.

[57] ABSTRACT

A priority network utilizing a common bus coupled to a plurality of priority seeking peripheral devices wherein a processor or any number of processors is connected to the common bus. Each successive peripheral device is connected to the common bus in increasing priority order, such that each device will have a unique priority defined. Each peripheral device is provided with an associated peripheral control unit. Each of the peripheral control units is connected in serial fashion on an enabling line with the output of the higher priority control unit providing an enabling input to the next lowest priority peripheral control unit, such that the highest priority device requesting bus access prevents all lower priority devices from gaining access to the common bus until the higher priority device has completed its data transfer.

5 Claims, 6 Drawing Figures

PRIORITY NETWORK FOR DEVICES COUPLED BY A COMMON BUS

BACKGROUND OF THE INVENTION

The present invention relates generally to data processing systems and more particularly to a priority determining system for a common bus.

A central processor is typically coupled by a common bus to a plurality of peripheral devices each of which requires access to the central processor on some priority basis. Priority determination is required for the case where two or more peripheral devices attempt to obtain control of the common bus at once. A number of prior art priority determination systems exist. One such system is described in an article entitled, "Unified Bus Maximizes Minicomputer Flexibility," by D. Chertkow et al., ELECTRONICS, Dec 21, 1970, pages 47-52. Generally the major advantage of a common or unified electrical bus is in the ability to utilize more advanced memories and peripheral equipment as the hardware becomes available. This is possible because all the devices used with a common bus send and receive address, data, and control information, by the same set of signals.

In U.S. Pat. No. 3,766,530, entitled "Communications Between Central Unit And Peripheral Units," by R. Atsushi Ito, there is disclosed a priority determining system wherein an interrogation signal is initially sent to all the peripheral devices. In response to the interrogation signal, those peripheral devices requesting service are placed in a waiting queue and are then serviced in sequence. After the servicing is completed for all devices in the queue, the following interrogation signal causes another waiting queue to be established.

It would be highly advantageous to have a priority determining system that allows the highest priority devices to have access to the common bus without the time delay encountered by having to first allow access to all the peripheral devices that make up one queue.

The present invention utilizes the advantages of the common bus without the need for establishing a waiting queue.

In U.S. Pat. No. 3,629,854, entitled, "Modular Multiprocessor System with Recirculating Priority," by E. A. Hauch et al., there is disclosed another type of priority system which operates with a common bus. The system operates by allowing each processor to scan all peripheral devices when the processor receives a priority bit. The priority bit is circulated in a closed loop, which links each of the processors. Only the processor having possession of the circulating bit is allowed access to the common bus.

SUMMARY OF THE INVENTION

The present invention is directed to a common bus priority system wherein there is provided an electrical bus having a high priority end and a plurality of peripheral devices connected to the common bus with the priority of each peripheral device being determined by the connection position of the device with respect to the high priority end of the common bus. A processor is operatively connected to the common bus at the end corresponding to the lowest priority position. Each peripheral device has associated therewith a control unit, with each control unit connected in series for passing an enabling signal from the highest priority control unit to the lowest priority control unit. Logic circuitry at each control unit produces a flag signal, when the peripheral device requests priority. Additional logic circuitry, control unit responsive to the flag signal, prevents the passing of the enabling signal. Logic circuitry responsive to the control unit having the enabling signal present at its input, but not its output, operatively connects the associated peripheral device to the common bus. Logic circuitry responsive to the completion of service to the priority peripheral device produces a new set of enabling and flag signals.

From the foregoing, it can be seen that it is a primary object of the present invention to provide an improved common bus priority system.

It is another object of the present invention to provide a common bus priority system which utilizes few electrical lines and which is low in cost.

These and other objects of the present invention will become more apparent when taken in conjunction with the following description and drawings wherein like characters indicate like parts and which drawings form a part of the present invention.

DESCRIPTION OF THE PREFERRED EMBODIMENT OF THE INVENTION

Figure 1:
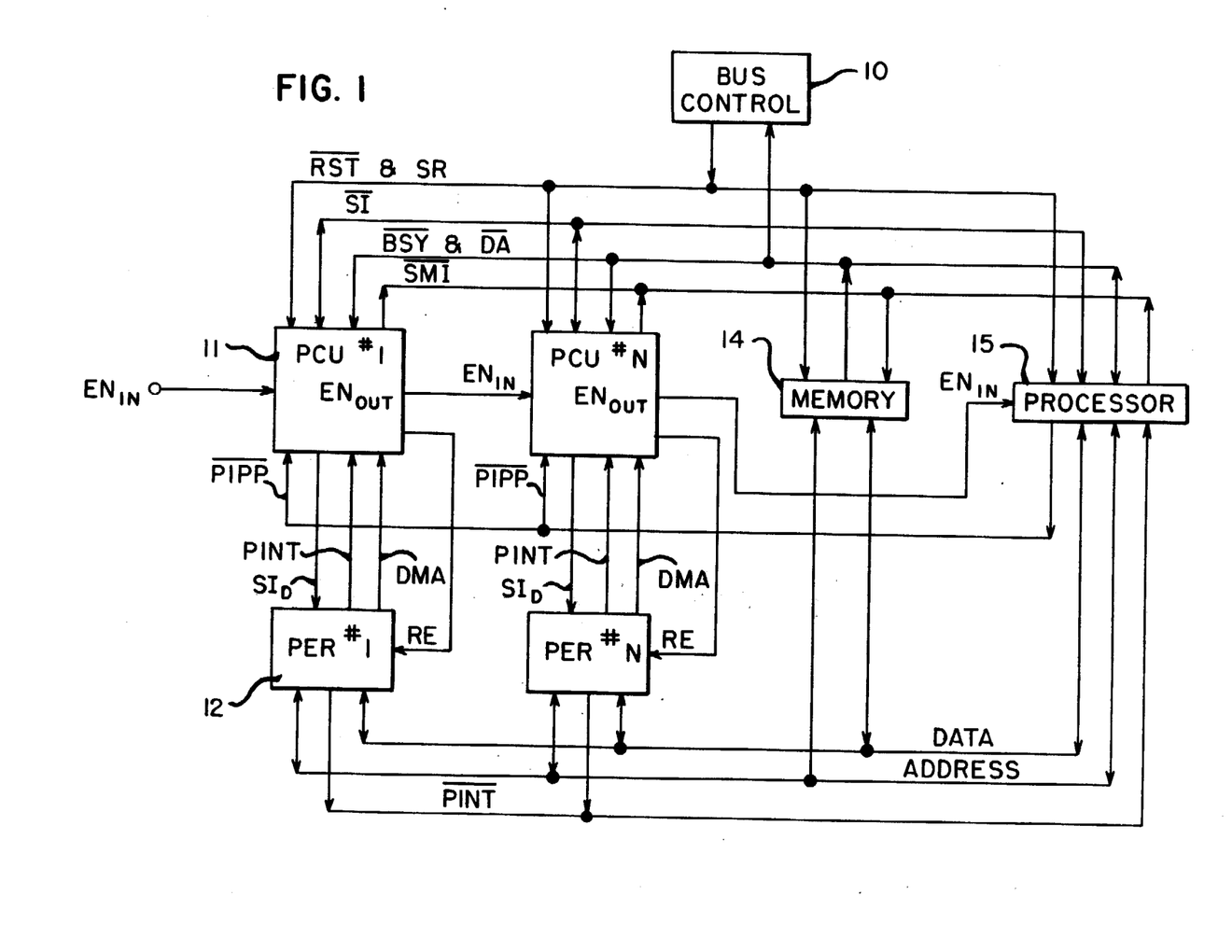
FIG. 1 is a block schematic diagram of the common bus system.

FIG. 1 illustrates in block diagram form the major interconnections between a data processor 15, a number of peripheral units (PER) 12, a memory 14, a number of peripheral control units (PCU) 11, and a bus control 10. The bus control unit 10 is some applications may be included within the processor 15. For purposes of illustration and simplicity there are shown only two peripheral units 12, labled PER #1 and PER #N, it being understood that more peripheral units may be included. The peripheral units may be devices such as printers, tape and disc units, card readers, communications equipment, and other processors. Each of the peripheral units 12 is interconnected to an associated peripheral control unit 11. For purposes of illustration there are shown only two peripheral control units labeled PCU #1 and PCU #N.

Throughout this disclosure the term common bus refers to the group of signal wires which simultaneously send and/or receive signals to more than one peripheral device. In FIG. 1 the common bus is comprised of the horizontal interconnecting lines of major length. A single bus wire may at different times carry different signals. Each of the peripheral units 12 is connected by means of an associated perpheral control unit 11 to the common bus control lines in an order of decreasing priority. The lowest priority device connected to the common bus is the procesor 15. The processor generally has the lowest priority because its response time is the least critical amongst the other common bus devices. The peripheral devices may for example be involved with some kind of mechanical motion or real time processing which requires immediate attention.

The present invention selects the peripheral control unit having the highest priority when more than one request for bus access is made. This eliminates the ambiguity that exists when two or more devices try to obtain access to the common bus simultaneously while providing immediate access to the device with the highest priority. The peripheral control units 11 are connected together, output-to-input in serial fashion, by a line designated EN. The output of the last peripheral control unit PCU #N is connected to the input of the lowest priority device, in this particular case the processor 15. The signals present on the enable line (EN) tell the particular peripheral control unit that is requesting access that it either has or does not have the highest priority. For example, the peripheral control unit PCU #1, the unit with the highest priority, is provided with a continuous high level signal indicative of a logic 1 level signal, on its input terminal labeled $EN_{in}$. The logic 1 level signal at the input of a peripheral control unit indicates that the particular unit is of the highest priority in the string and if a request signal, logic level 1 signal, is present on either the PINT input or the DMA input from the peripheral unit connected to the respective peripheral control unit then the selected peripheral unit will be granted access to the common bus. In addition, the peripheral control unit will provide at its output labeled $EN_{out}$ a low level signal equivalent to a logic 0. That signal will be transmitted to the next peripheral control unit to effectively prevent the following peripheral control units from gaining access to the common bus for their associated peripheral units. The 0 level signal on each of the succeeding peripheral control units will be a logic level 0 indicating that a higher priority peripheral unit is requesting access to the common bus. To summarize, a logic level 0 at the enable input to any peripheral control unit causes a logic level 0 at the peripheral control units output. This will occur regardless of whether the associated peripheral unit is requesting access by means of providing a logic level 1 signal on either the PINT line or the associated DMA line. The PINT and DMA signal lines are both flag lines, in that they operate to flag the peripheral control units when bus access is required. In this disclosure the PINT signal line is used by a peripheral device to request a program-type interrupt by driving the program interrupt signal PINT to a logic level 1. The DMA signal line is used when the peripheral device is to transfer data to or from the memory directly. This particular type of transfer requires the peripheral device to drive the direct memory access signal DMA to a logic level 1 to obtain bus access and to provide an address to memory and to send or receive data.

The bus control device 10 provides the signals $\overline{RST}$ and SR to each of the peripheral control units, the memory, and the processor. Throughout this specification the presence of a bar over a signal indicates that the signal is the complement of the same signal without the bar. The signal $\overline{RST}$ is generated on a power up condition from the bus control unit when the bus control unit senses power being applied to the system. The reset signal $\overline{RST}$ is used to initialize, or clear, all system devices to their start condition. This initializing condition is applicable to the peripheral control units, the memory and the processor. The bus control unit 10 provides the signal SR. The signal SR is designated the start request signal and is sent to all peripheral control units, the memory, and the processor. The bus control 10 can inhibit start request SR pulses at its discretion. The signal $\overline{SI}$ is a start interrupt signal which is sent as a strobe signal along with the data on the DATA line during an interrupt data transfer to indicate to the processor that the data is interrupt data. Generally interrupt data is called an interrupt vector. The line labeled DATA interconnects the peripheral units with the memory and the processor 15. The term $\overline{SI_D}$ is a start interrupt signal sent from each peripheral control unit to its own peripheral unit and it will cause its peripheral unit to clear the associated PINT.

The signal $\overline{PIPP}$ is the program interrupt poll permit signal generated by the processor 15 and is applied to each of the peripheral control units 11. The $\overline{PIPP}$ signal operates to enable each peripheral unit through the peripheral control unit to use the common bus to send interrupt vector information to the processor 15. The signal line designated $\overline{SI}$ connects each of the peripheral control units to the processor 15. The lines labeled RE and $\overline{SI_D}$ from each of the peripheral control units to the peripheral units, are reset lines, which effectively reset the DMA and PINT signal circuits, respectively, within the peripheral control units. Each of the peripheral control units along with the processor 15 is connected by a control line labeled $\overline{SMI}$ to the memory 14. The presence of an $\overline{SMI}$ signal indicates to the memory that a memory cycle is to occur, hence $\overline{SMI}$ is interpreted to mean start memory. A unit having access to the common bus must place an appropriate signal on this line in order to cause the memory to do a memory cycle, whether the cycle be a read or a write cycle. The memory unit in turn will respond with a $\overline{BSY}$ signal the level of which indicates whether the memory cycle is complete. In effect then the $\overline{BSY}$ signal indicates that a bus data transfer is in progress and that the bus data lines are occupied. The presence of a $\overline{DA}$ signal indicates that data is available. The trailing edge of the $\overline{DA}$ signal is used to clock data into the requesting device. The data available signal, during a DMA operation, is generated by the memory for use by the bus control unit 10 for generation of the start request signal SR. The line labeled ADDRESS carries the word or byte address to be sent to the memory unit during a memory read or write operation.

Figure 2A:
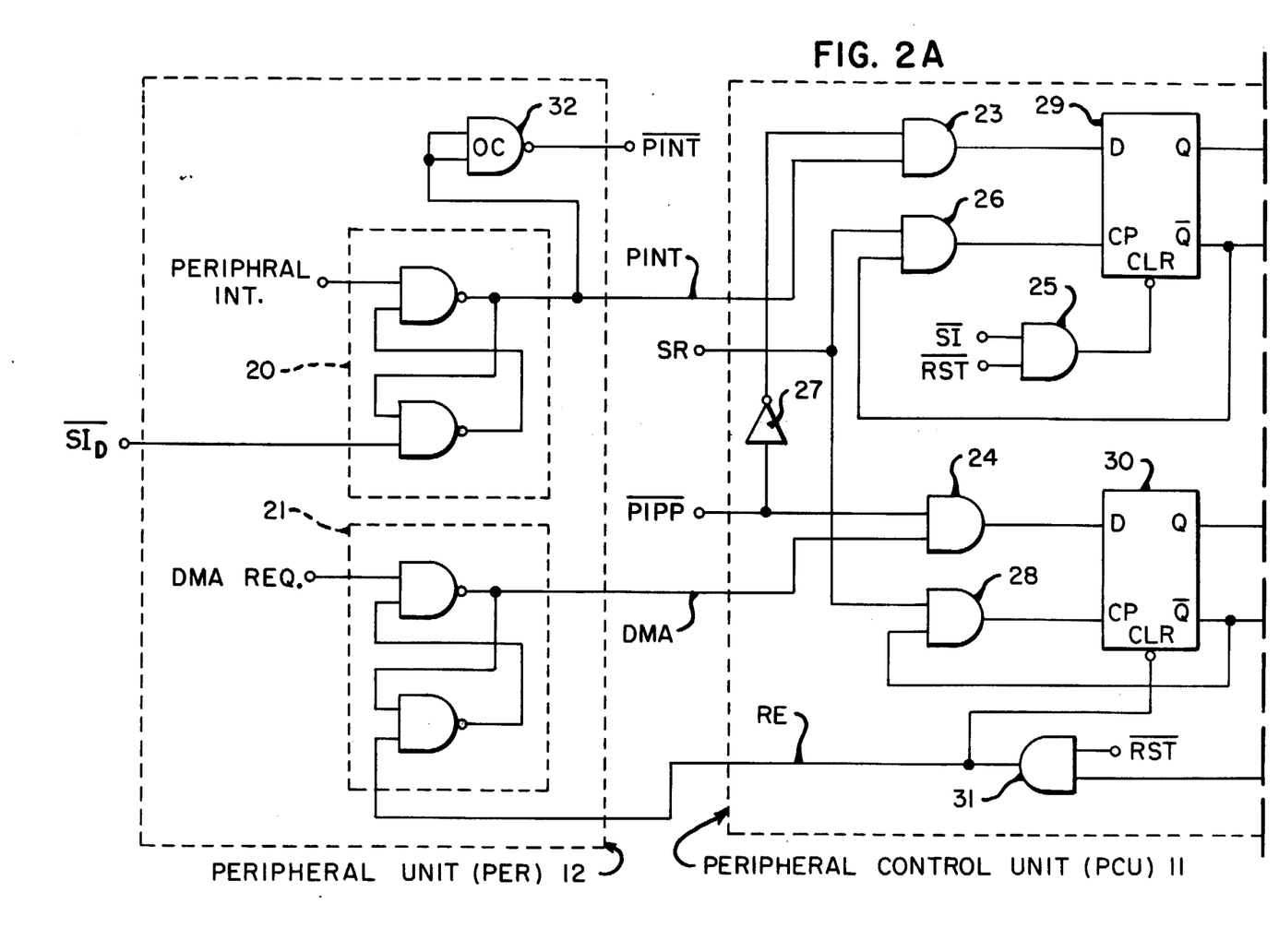
FIGS. 2A and 2B illustrate, in logic diagram form, a portion of the common bus system of FIG. 1.
Figure 2B:
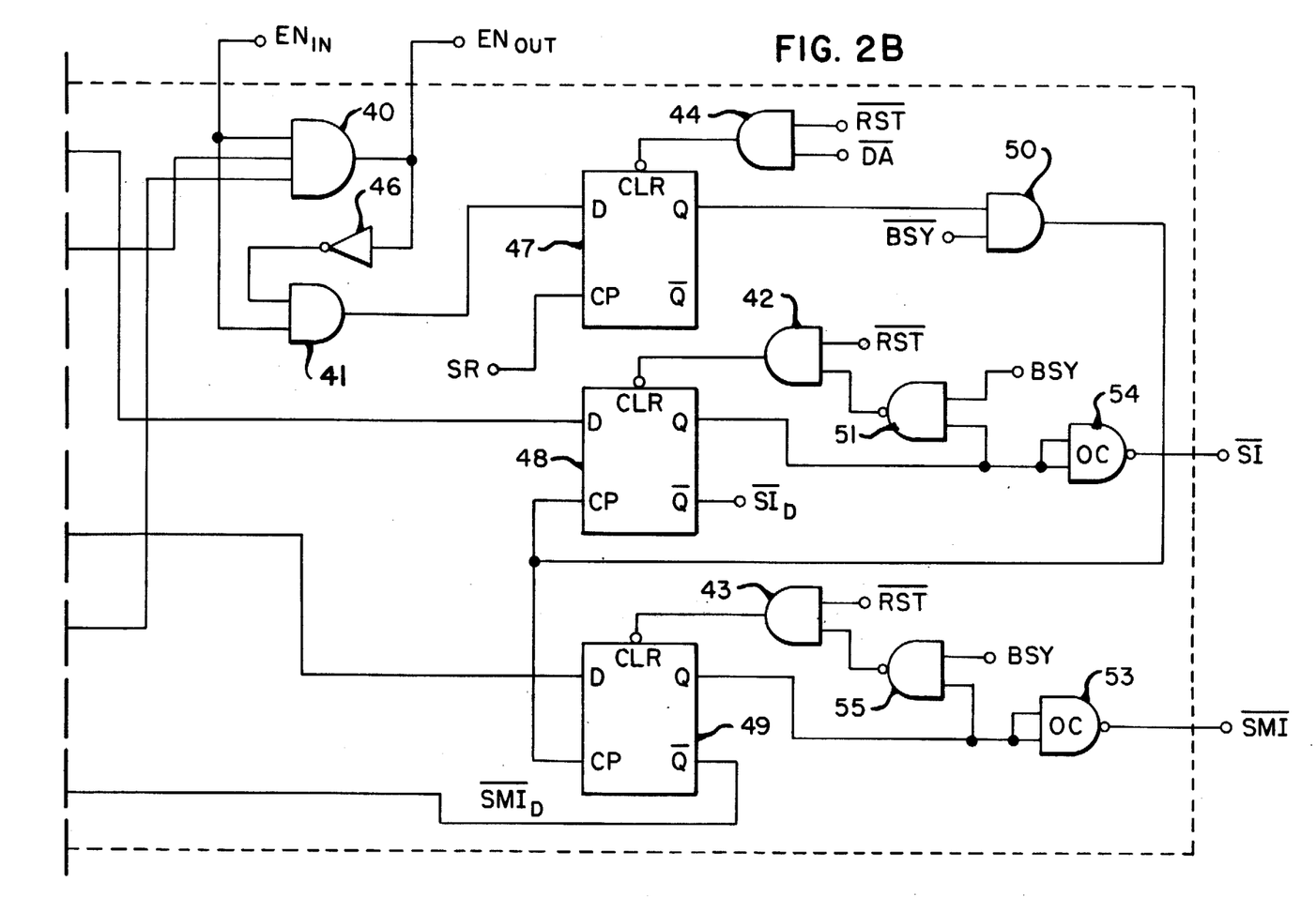

Referring now to FIGS. 2A and 2B; each peripheral unit 12 is comprised of the control circuitry shown in FIG. 2A. Two latches 20 and 21, each comprised of two cross coupled NAND gates provide storage of DMA and INTERRUPT requests to the peripheral control unit 11. The open collector NAND gate 32 allows the wire OR condition of all PINT lines to indicate to the processor that one or more interrupts are withstanding. Latch 20, upon the occurrence of a low level signal on the peripheral interrupt request line, will cause a high level signal to appear at both inputs to the open collector gate 32, which in turn places a low signal on the common bussed PINT line. The latch 20 will remain activated until it receives a low level signal from the peripheral control unit on the $\overline{SI_D}$ line, which indicates that this particular interrupt has been acknowledged and the software has been vectored to the appropriate interrupt service routine. Latch 21, which works in a similar manner, will go high upon the occurrence of a low level signal on the peripheral DMA request line and will remain active until RE goes low. The latch 21 being set will cause the DMA line to the peripheral control unit to go high. RE will be returned as a low signal when access in granted to this particular peripheral unit.

If more than one PINT is clocked into its appropriate request flip-flip (flip-flop 29), the interrupt request of lower priority must be cleared, otherwise, the processor could be interrupted out of a software routine which should not be interrupted. In order for the software to be able to control when an interrupt will be allowed, the interrupt requests which were not recognized must be cleared, so the first $\overline{SI}$ is used to deactivate all interrupt requests that were not acknowledged. The PINT'S not completed will have to wait for the PIPP signal, before they can once again set the interrupt request flip-flop 29. Only after the interrupt has been allowed access, will $\overline{SI}_D$ be generated and this will clear the PINT latch 21 inside the peripheral unit 12.

Referring now to the peripheral control unit 11; the output signal PINT from latch 20 is coupled to an input of an AND gate 23. The other input to AND gate 23 is the signal PIPP, formed by the logical inversion of $\overline{PIPP}$ by inverter 27. The output signal from AND gate 23 is applied to the D input of a D-type flip-flip 29. A D-type flip-flop is one whose output is a function of the input that appears one clock pulse earlier. Flip-flop 29 is clocked at SR time by the application of the SR signal to the CP input terminal of flip-flop 29 via AND gate 26. Flip-flop 29 becomes set, that is a high level signal appearing at its Q output, if its D input is high at the rise of the SR clock pulse. The $\overline{Q}$ output of flip-flop 29 is connected as an input to the AND gate 26, and an AND gate 40 (FIG. 2B.) The signal $\overline{SI}$ is applied to the AND gate 25 along with the input $\overline{RST}$, so as to promote clearing of flip flop 29. The AND gate 40 is the gate which determines the priority of the particular peripheral unit on the bus. The AND gate 40 receives as one of its inputs the enabling signal $EN_{in}$. The output of AND gate 40 is the $EN_{out}$ signal. A program interrupt request appearing on the PINT line of AND gate 23 will translate into a high level signal present at the Q output of flip-flop 29 and a low level signal present at the $\overline{Q}$ output which will feed into AND gate 40 causing a low level signal to appear at the $EN_{out}$ output. This low level signal will indicate to the remaining units on the common bus that they do not have priority. The $EN_{out}$ signal from AND gate 40 is logically inverted by the inverter 46 and is applied as an input to the AND gate 41. The output of AND gate 41 for the input conditions just mentioned will be a high level signal. This high level signal will occur whenever the particular peripheral unit has priority and wants to access the bus.

The D-type flip-flop 47 is an access flip-flop which provides an output signal at its Q output the level of which when high indicates that the particular peripheral unit is requesting and has priority to use the bus. The SR clock signal is applied to the CP input of flip-flop 47. Actual access to the common bus is limited to a time condition when the bus is not busy. This condition is indicated by the input $\overline{BSY}$ applied to the AND gate 50. With the not busy signal, $\overline{BSY}$, present on the input of the AND gate 50 and the fact that the other input is high, because flip-flop 47 is set, AND gate 50 will provide a high level signal at its output. This high level signal will be applied as a clocking signal to the CP terminals of flip-flops 48 and 49. The AND gate 44 will clear flip-flop 47 upon sensing a low level on $\overline{RST}$ or $\overline{DA}$. Flip-flop 48 receives at its D input the signal from flip-flop 29. The Q output of flip-flop 48 is then fed to an open collector NAND gate 54 the output of which is the $\overline{SI}$ signal. The $\overline{SI}$ signal is the signal which informs the processor 15 that the data presently on the DATA lines is an interrupt vector and the processor upon receiving the interrupt vector will determine the particular interrupt service routine starting address. The open collector NAND gate 54 may be of the type shown in FIG. 3 of the article entitled "Unified Bus Maximizes Minicomputer Flexibility" which article was referenced in the forward part of the present specification. The signal $\overline{SI}$ present at the output of the open collector gate 54 remains until a busy signal BSY is received on the input of the NAND gate 51. The occurrence of the BSY signal indicates that the peripheral control unit is interfacing with the common bus. The NAND gate 51 also receives as an input the signal present at the Q output of flip-flop 48. The output of gate 51 is applied to one input of AND gate 42, while the other input is $\overline{RST}$. Occurrence of either of these signals being low, will clear flip-flop 48. At the $\overline{Q}$ output of flip-flop 48 there appears the signal $\overline{SI}_D$ which signal is fed back to latch 20 in order to clear the original source of the program interrupt.

For DMA interaction, AND gate 24 receives the DMA signal from the latch 21 and a $\overline{PIPP}$ signal from the processor. When both signals become present, gate 24 output indicates that a DMA device may request the bus. The output signal from gate 24 is fed to the D input of a D-type flip-flop 30. The Q output of flip-flop 30 is connected to the D input of flip-flop 49. The $\overline{Q}$ output of flip-flop 30 is connected to an input of the AND gate 40 and to the input of an AND gate 28. The AND gate 28 receives as its other input the clocking signal SR. The output of AND gate 28 is directed to the clocking terminal CP of flip-flop 30. If the particular peripheral unit requesting the DMA transfer has priority the signal present at the Q output of flip-flop 47 will go high upon the prerequisite that BSY is high at the rise of SR which in turn will set flip-flop 49 such that its Q output will be at a high level. This high level signal will be fed to the input of an open collector NAND gate 53. The output of the gate 53 will be the common bus signal $\overline{SMI}$. The NAND gate 55 receives as inputs the signal at the Q output of flip-flop 49 and the BSY signal. The output of gate 55 is connected to one input of AND gate 43, while the other input is $\overline{RST}$. At the occurrence of either signal being low, gate 43 output will go low and will force flip-flop 49 to clear itself. The signal $\overline{SMI}$ will be generated when flip-flop 49 is set and the $\overline{BSY}$ signal is at a high level. This $\overline{SMI}$ signal, referring back to FIG. 1, is directed to the memory unit when a memory cycle is to occur, which in turn causes the memory to take appropriate action to either read or to transfer data to the peripheral unit having priority. The $\overline{Q}$ terminal of flip-flop 49 labeled $\overline{SMI}_D$ is returned to AND gate 31, so as to facilitate clearing of the peripheral DMA request once it has been acknowledged. It also causes flip-flop 30 to be cleared, so further requests for bus service must be reinstated by the peripheral unit at the output of latch 21.

Figure 3:
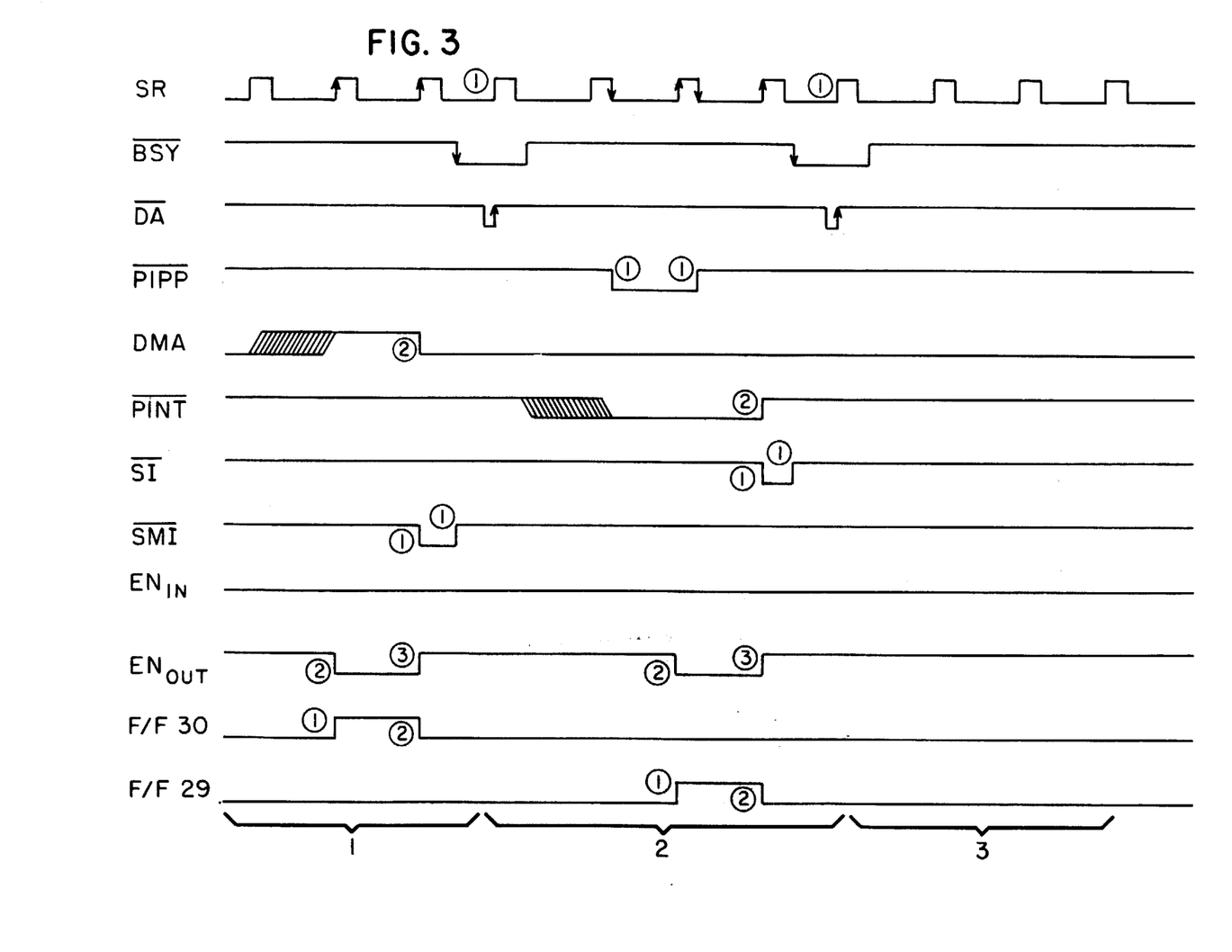
FIG. 3 illustrates a number of waveforms that are useful in understanding the operation of the present invention.

Referring to FIG. 3, the start request pulses SR are generated at a fixed interval when the common bus is in a quiescent state. At other times the period between the SR clock pulses is a function of the common bus activity. At the fixed interval, the time period between pulses is equal to the memory cycle time period. The width of the SR clock pulse in the preferred embodiment is less than 30 nanoseconds. Three conditions of bus operation are shown in FIG. 3. The conditions are labeled 1 to 3, respectively, along the lower horizontal axis of the figure. The horizontal axis is a time axis which increased from left to right. The operating condition labeled 1 is the condition of DMA transfer. The condition occurring during the operation labeled 2 is the program interrupt condition, and the condition labeled 3 is the quiescent condition.

The circled numbers, ①,②, and ③ correspond to the occurrence of events in a particular time sequence, which sequence is initiated by an arrowed labeled leading or trailing edge, of the signals SR, $\overline{BSY}$ or $\overline{DA}$. As an example, when the first arrow labeled leading edge of the pulse sequence SR occurs, flip-flop 30 goes high "first" and $EN_{out}$ goes low "second". The shaded areas in the DMA and $\overline{PINT}$ signals indicate areas within which a transition may occur due to other conditions within the system.

Referring to the operating condition 1, that is, a DMA transfer condition, in conjunction with the logic diagram of FIGS. 2A and 2B, a DMA request is shown by the rise in the DMA signal from a low level to a high level. This signal appears at the output of latch 21 contained in the peripheral unit. At this point in time the signal $\overline{PIPP}$ is also high, so the occurrence of an SR pulse will set flip-flop 30 allowing the peripheral control unit to request the next bus cycle. Throughout this discussion it is assumed that the particular unit has priority as evidenced by the fact that the $EN_{in}$ is continually at a high level. If this signal were to go low, to a 0 level for example, then another preceding device would have a higher priority and would gain bus access. The signal $EN_{out}$ goes to a low level to deactivate all of the lower priority peripheral units in terms of their being able to access the bus. The next occurring SR pulse will grant access to the particular peripheral unit having priority and upon the occurrence of a high level on $\overline{BSY}$ will start a memory cycle by producing a low level signal on the $\overline{SMI}$ line. The $\overline{SMI}$ signal will be low for the same period of time as the $\overline{BSY}$ signal is high. During this time the address lines are activated by the peripheral and when appropriate, the data lines are also active. Flip-flop 49 is indicative of the state of $\overline{SMI}$, and when set, presents a low condition at the $\overline{Q}$ output which clears flip-flop 30 and latch 21 via the term RE.

For condition 2, which is the program interrupt condition, the peripheral unit by setting latch 20 requests a program interrupt. At the following fall of an SR clock pulse the processor will generate a low level $\overline{PIPP}$. The inversion of $\overline{PIPP}$ will enable the program interrupt signal PINT to request the bus at the ensuing rise of SR, at which time $EN_{out}$ will go low to disable the remaining devices on the priority chain. The next SR pulse to follow will set flip-flop 47 and upon sensing a high level $\overline{BSY}$ will instruct the peripheral control unit to generate the signal $\overline{SI}$ which will cause the transfer of vector information to the processor. The signal $\overline{SI}$ will remain at the low level for the entire duration of the $\overline{BSY}$ signal. Flip-flop 29 will be cleared by the $\overline{SI}$ signal which in turn will force the output of the AND gate 40 to a high level.

The operating condition in FIG. 3 shows the level of the signals for the quiescent state which exists when the peripheral unit is not requesting bus access. For this condition the clock pulses SR are generated continuously at a fixed time interval.

Figure 4:
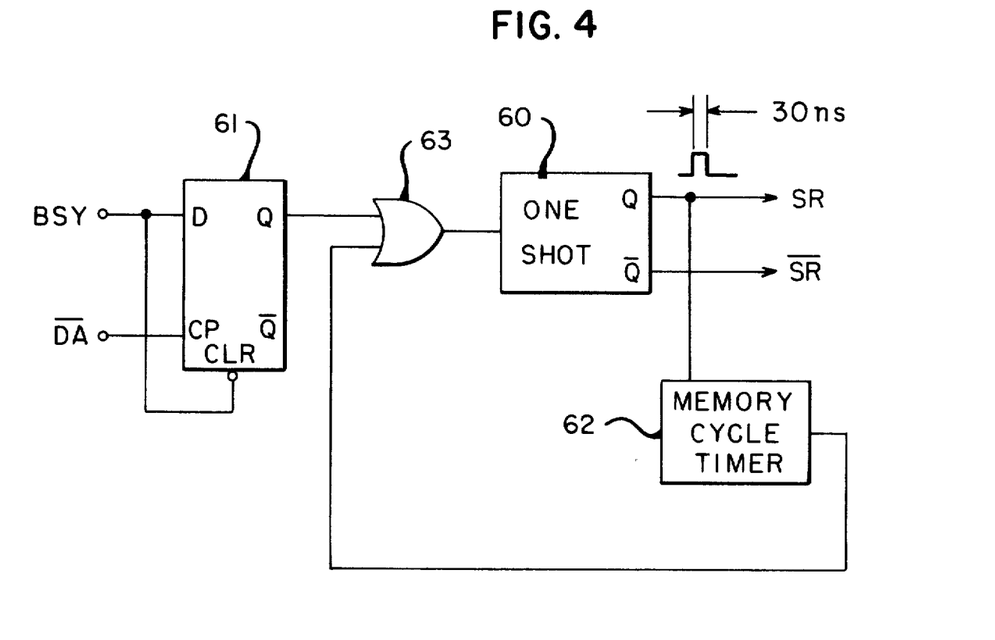
FIG. 4 is a logic diagram of a circuit that may be used to generate the system clock.

Referring to FIG. 4 a generator for generating SR clock pulses is shown comprised of flip-flop 61, one-shot 60, OR gate 63 and timer 62. This clock generator may be contained within the bus control unit 10 which unit may be contained in the processor 15. In operation, the one-shot 60 provides a single pulse the width of which is approximately 30 nanoseconds. This pulse is provided when either of two stimuli become present. The trailing edge of $\overline{DA}$, sets flip-flop 61 to provide one stimulus, while the timer 62, sensing the absence of a memory cycle for a substantial time, provides the second. These two signals are combined at OR gate 63, the output of which generates the trigger to one-shot 60.

Figure 5:
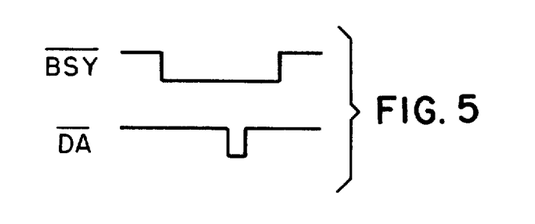
FIG. 5 illustrates two waveforms that are associated with the operation of the circuit of FIG. 4.

The signal $\overline{DA}$ is a data available signal, which signal is available from the processor and the memory in this system. FIG. 5 illustrates the transitions of the $\overline{DA}$ signal with respect to the transitions of the $\overline{BSY}$ signal. The signal $\overline{DA}$ occurs after the transition of the busy signal $\overline{BSY}$ from a high level to a low level and will disappear before the deactivation of $\overline{BSY}$. The processor will generate the $\overline{BSY}$ and the data available signal $\overline{DA}$ when a peripheral generates an $\overline{SI}$ signal. The busy $\overline{BSY}$ and data available signal $\overline{DA}$ will be generated by the memory when the $\overline{SMI}$ signal becomes active on the bus.

While there has been shown what is considered to be the preferred embodiment of the invention, it will be manifest that many changes and modifications may be made therein, without departing from the essential spirit of the invention. It is intended, therefore, in the annexed claims, to cover all such changes and modifications as may fall within the true scope of the invention.

What is claimed is:

1. A common bus system comprising:
   a common bus having one end;
   a plurality of devices coupled to said bus, with the priority of said devices being determined by their proximity to said one end;
   means at each device for producing a flag signal to indicate that it needs servicing;
   a plurality of device control units each associated with a device for receiving a produced flag signal and for passing an enabling signal from the highest priority device control unit to the first device control unit receiving a flag signal and for preventing the passage of the enabling signal to all device control units having a lower priority than the first device producing a flag signal, so as to allow access to the highest priority device requesting common bus access;
   a processor connected to said one end of said common bus;
   a memory unit connected to said common bus; and
   bus control means connected to said common bus and responsive to signals from said plurality of device control units for interrupting said processor when a device desires processor access, said bus control means also sensing the availability of said memory unit for providing a signal to said device control units permitting memory unit access.

2. The system according to claim 1 wherein said device control units are also comprised of:
   logic means responsive to the simultaneous presence of an enabling signal, a flag signal and said availability signals for operatively connecting the associated device to said common bus.

3. The data processing system according to claim 2 and further comprising means for resetting said system at the completion of each requested interrupt.

4. A data processing system comprising a common bus having one end defined as a low priority end;
   a processor connected to the said one end of said common bus;

a memory unit connected to said common bus;

a plurality of peripheral devices coupled to said common bus, with the priority of said devices being determined by their proximity to said one end;

means at each peripheral device for producing a first flag signal when a processor interrupt is requested and a second flag signal when a memory interrupt is requested;

a plurality of peripheral device control units each associated with a peripheral device for receiving a produced flag signal and for passing an enabling signal from the highest priority control unit to the first peripheral control unit receiving a flag signal and for preventing the passage of the enabling signal to all peripheral control units having a lower priority than the first peripheral device producing a flag signal, each peripheral control unit also comprising logic means responsive to the first and the second flag signals for providing signals to said processor and said memory unit respectively, indicating an access request;

means responsive to an access granted signal from said memory unit or said processor unit for granting access to the highest priority peripheral device requesting bus access; and bus control means for controlling times at which bus access can be granted after being requested by said control units.

5. The data processing system according to claim 4 and further comprising means for resetting said system at the completion of each requested interrupt.

* * * * *